US012739939B2

(12) United States Patent
Hwang et al.

(10) Patent No.: US 12,739,939 B2
(45) Date of Patent: Sep. 15, 2026

(54) METHOD AND APPARATUS FOR TRANSMITTING AND RECEIVING SIGNAL IN WIRELESS COMMUNICATION SYSTEM

(71) Applicant: LG Electronics Inc., Seoul (KR)

(72) Inventors: Seunggye Hwang, Seoul (KR); Youngdae Lee, Seoul (KR); Jaehyung Kim, Seoul (KR); Suckchel Yang, Seoul (KR); Seonwook Kim, Seoul (KR); Sunghoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 18/549,524

(22) PCT Filed: Aug. 8, 2023

(86) PCT No.: PCT/KR2023/011634
§ 371 (c)(1),
(2) Date: Sep. 7, 2023

(87) PCT Pub. No.: WO2024/035047
PCT Pub. Date: Feb. 15, 2024

(65) Prior Publication Data

US 2025/0024552 A1 Jan. 16, 2025

Related U.S. Application Data

(60) Provisional application No. 63/397,364, filed on Aug. 11, 2022.

(51) Int. Cl.
*H04W 76/28* (2018.01)
*H04W 72/1263* (2023.01)

(52) U.S. Cl.
CPC ....... *H04W 76/28* (2018.02); *H04W 72/1263* (2013.01)

(58) Field of Classification Search
CPC ... H04W 76/28; H04W 72/232; H04W 72/23; H04W 52/0229; H04W 72/0446; H04W 24/10; H04W 72/20
See application file for complete search history.

(56) References Cited

U.S. PATENT DOCUMENTS 11,917,541 B2 * 2/2024 Nam .................... H04W 72/23
2015/0250017 A1 * 9/2015 Ingale .................. H04W 72/20 370/280

(Continued)

FOREIGN PATENT DOCUMENTS

KR 10-2020-0052366 5/2020
KR 10-2022-0065007 5/2022

(Continued)

OTHER PUBLICATIONS

Extended European Search Report in European Appln. No. 23761416.9, mailed on Oct. 30, 2024, 10 pages.

(Continued)

*Primary Examiner* — Khalid W Shaheed
(74) *Attorney, Agent, or Firm* — Fish & Richardson P.C.

(57) ABSTRACT

Disclosed herein is a method of receiving a signal by a user equipment (UE) in a wireless communication system. The method may include receiving a discontinuous reception (DRX) related configuration through higher layer signaling, receiving downlink control information (DCI) in an on-duration of a DRX cycle based on the DRX related configuration, and receiving a downlink signal in an on-duration of a subsequent DRX cycle following the DRX cycle. The on-duration of the subsequent DRX cycle may be configured based on the DCI. The DCI may include at least one of first information for adjusting a start of the on-duration of the subsequent DRX cycle and second information related to an (Continued)

accumulation of the number of times the start of the on-duration of the subsequent DRX cycle has been adjusted.

14 Claims, 11 Drawing Sheets

(56) References Cited

U.S. PATENT DOCUMENTS

| | | | | |
|---|---|---|---|---|
| 2020/0120596 | A1 | 4/2020 | Yu et al. | |
| 2021/0006356 | A1* | 1/2021 | Khoshnevisan | H04L 1/1621 |
| 2022/0346008 | A1* | 10/2022 | Xu | H04L 5/001 |
| 2023/0354467 | A1* | 11/2023 | Xu | H04W 76/28 |
| 2024/0080859 | A1* | 3/2024 | Shubhi | H04W 76/28 |

FOREIGN PATENT DOCUMENTS

| | | |
|---|---|---|
| WO | WO 2022/037664 | 2/2022 |
| WO | WO 2022/152924 | 7/2022 |

OTHER PUBLICATIONS

FGI, "Discussion on XR-specific power saving," R2-2206986, 3GPP TSG-RAN WG2 Meeting #119 Electronic, Online, Aug. 2022, 5 pages.

Google Inc., "XR-specific power saving techniques," R2-2207864, 3GPP TSG-RAN WG2 Meeting #119 Electronic, Online, Aug. 2022, 15 pages.

International Search Report and Written Opinion in International Appln. No. PCT/KR2023/011634, mailed on Nov. 23, 2023, 9 pages.

* cited by examiner

FIG. 11

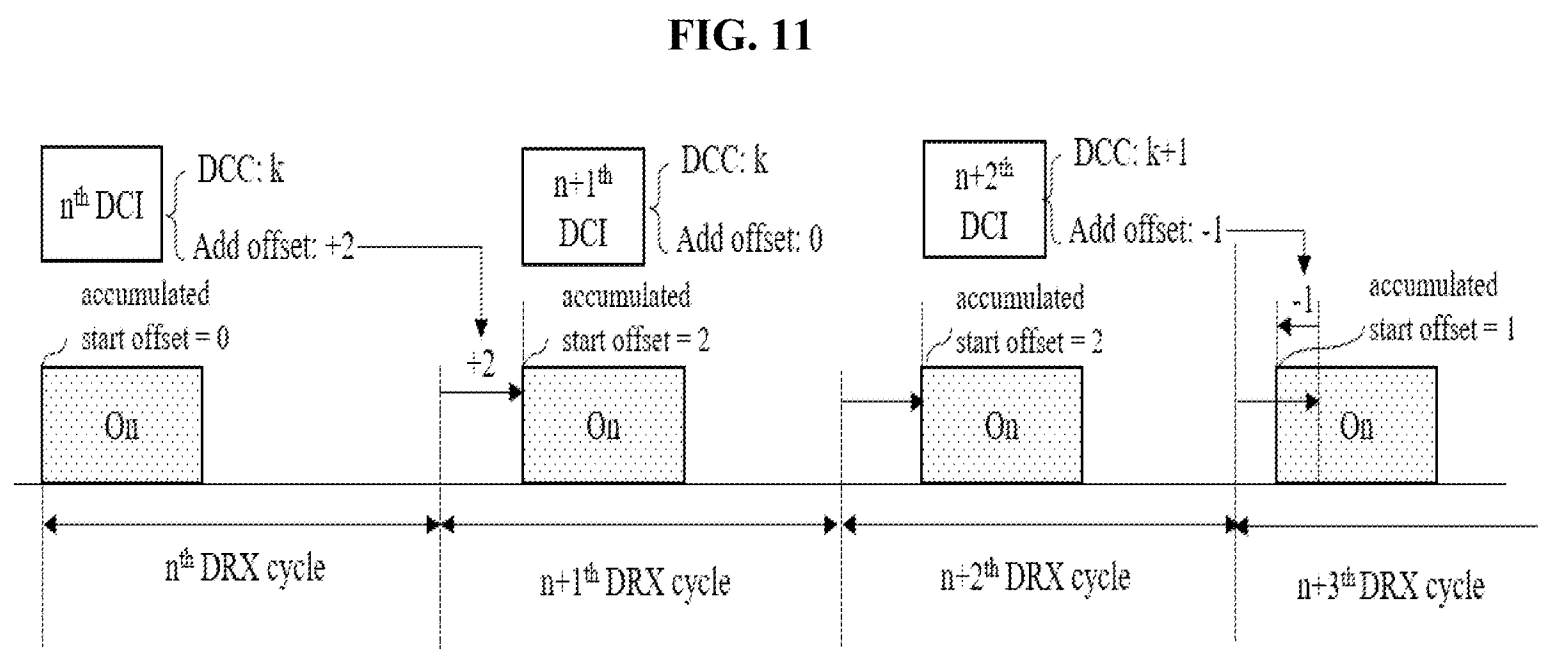

$n^{th}$ DCI
DCC: k
Add offset: +2
accumulated start offset = 0
On
$n^{th}$ DRX cycle
+2
$n+1^{th}$ DCI
DCC: k
Add offset: 0
accumulated start offset = 2
On
$n+1^{th}$ DRX cycle
$n+2^{th}$ DCI
DCC: k+1
Add offset: -1
accumulated start offset = 2
On
$n+2^{th}$ DRX cycle
-1
accumulated start offset = 1
On
$n+3^{th}$ DRX cycle

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2023/011634, filed on Aug. 8, 2023, which claims the benefit of U.S. Provisional Application No. 63/397,364, filed on Aug. 11, 2022. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method of receiving a signal by a user equipment (UE) in a wireless communication system. The method may include receiving a discontinuous reception (DRX) related configuration through higher layer signaling, receiving downlink control information (DCI) in an on-duration of a DRX cycle based on the DRX related configuration, and receiving a downlink signal in an on-duration of a subsequent DRX cycle following the DRX cycle. The on-duration of the subsequent DRX cycle may be configured based on the DCI. The DCI may include at least one of first information for adjusting a start of the on-duration of the subsequent DRX cycle and second information related to an accumulation of the number of times the start of the on-duration of the subsequent DRX cycle has been adjusted.

The first information may be related to an offset from a start of the subsequent DRX cycle to the start of the on-duration.

The offset may be accumulated in each DRX cycle,

The first information may be related to an increment or decrement of the offset.

The second information may be a modulo operation on an accumulated value of the number of times the start of the on-duration has been adjusted based on each DCI up to a current DCI.

The start of the on-duration of the subsequent DRX cycle may be adjustable only once for each DRX cycle.

The downlink signal may include a subsequent DCI received in the on-duration of the subsequent DRX cycle.

The UE may determine, based on the second information, whether reception of preceding DCI configured to adjust the start of the on-duration of the subsequent DRX cycle has been missed.

Based on the reception of the preceding DCI having been missed, an initialization or reconfiguration of the DRX related configuration may be performed.

The DCI may be related to scheduling of traffic having a non-integer periodicity.

In another aspect of the present disclosure, a processor-readable recording medium having recorded thereon a program for performing the signal reception method described above may be provided.

In another aspect of the present disclosure, a terminal for performing the above-described signal reception method may be provided.

In another aspect of the present disclosure, a device for controlling a terminal for performing the above-described signal reception method may be provided.

In another aspect of the present disclosure, a method of transmitting a signal by a base station in a wireless communication system may include transmitting a discontinuous reception (DRX) related configuration through higher layer signaling, transmitting downlink control information (DCI) in an on-duration of a DRX cycle based on the DRX related configuration, and transmitting a downlink signal in an on-duration of a subsequent DRX cycle following the DRX cycle. The on-duration of the subsequent DRX cycle may be configured based on the DCI, and the DCI may include at least one of first information for adjusting a start of the on-duration of the subsequent DRX cycle and second information related to an accumulation of the number of times the start of the on-duration of the subsequent DRX cycle has been adjusted.

In another aspect of the present disclosure, a base station for performing the above-described signal transmission method may be provided.

Advantageous Effects

According to an embodiment of the present disclosure, wireless signal transmission/reception procedures can be performed accurately and efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 11 is a diagram illustrating dynamic adjustment of DRX on-duration according to an embodiment.

MODE FOR DISCLOSURE

Figure 1:
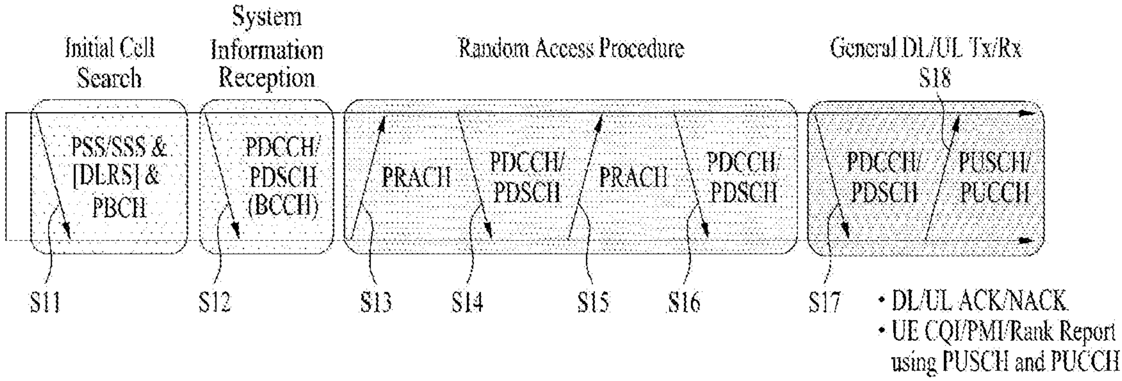
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.304: User Equipment (UE) procedures in idle mode and in RRC Inactive state
TS 38.321: Medium Access Control (MAC)
TS 38.331: Radio Resource Control (RRC) protocol specification
TS 37.213: Introduction of channel access procedures to unlicensed spectrum for NR-based access Terms and Abbreviations PSS: Primary Synchronization Signal
SSS: Secondary Synchronization Signal
CRS: Cell reference signal
CSI-RS: Channel State Information Reference Signal
TRS: Tracking Reference Signal
SS: Search Space
CSS: Common Search Space
USS: UE-specific Search Space
PDCCH: Physical Downlink Control Channel; The PDCCH is used to represent PDCCHs of various structures which may be used for the same purpose in the following description.
PO: Paging Occasion
MO: Monitoring Occasion
SI: System Information
PEI: Paging Early Indication
DRX: Discontinuous Reception
eDRX: Extended DRX In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
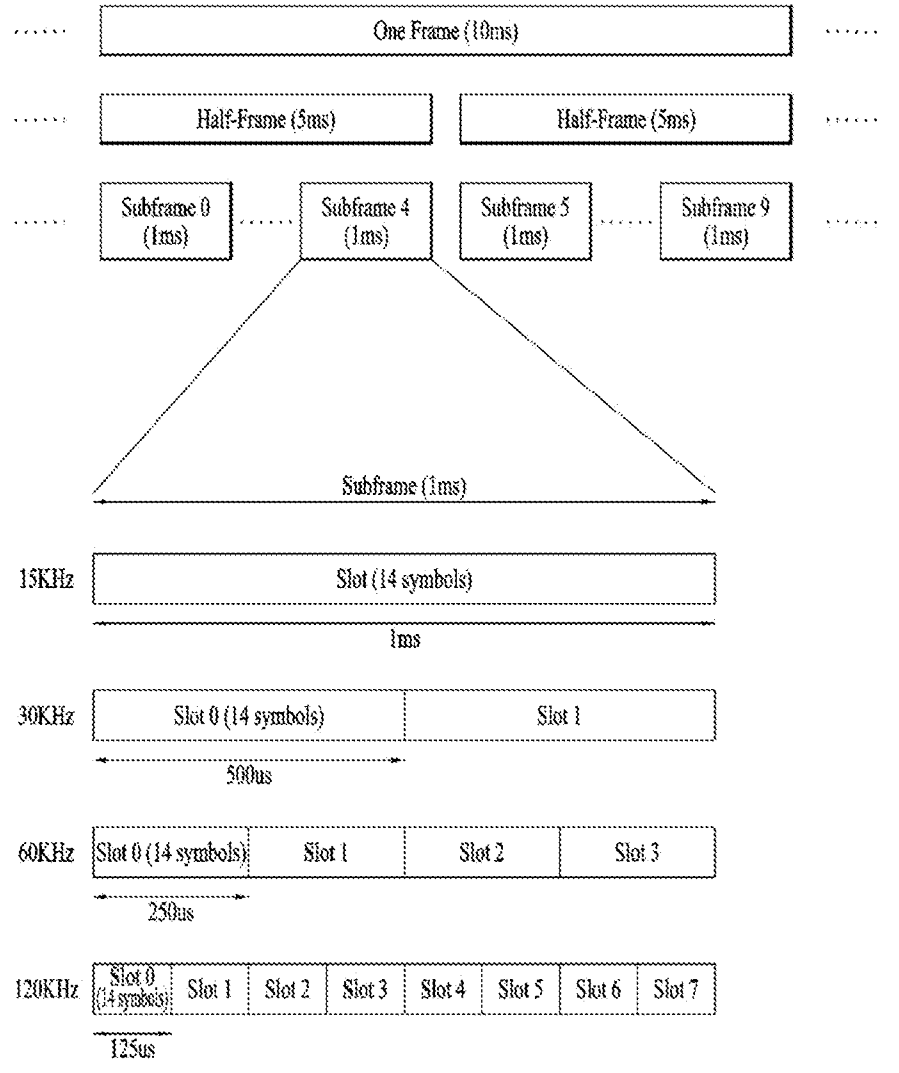
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{Slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
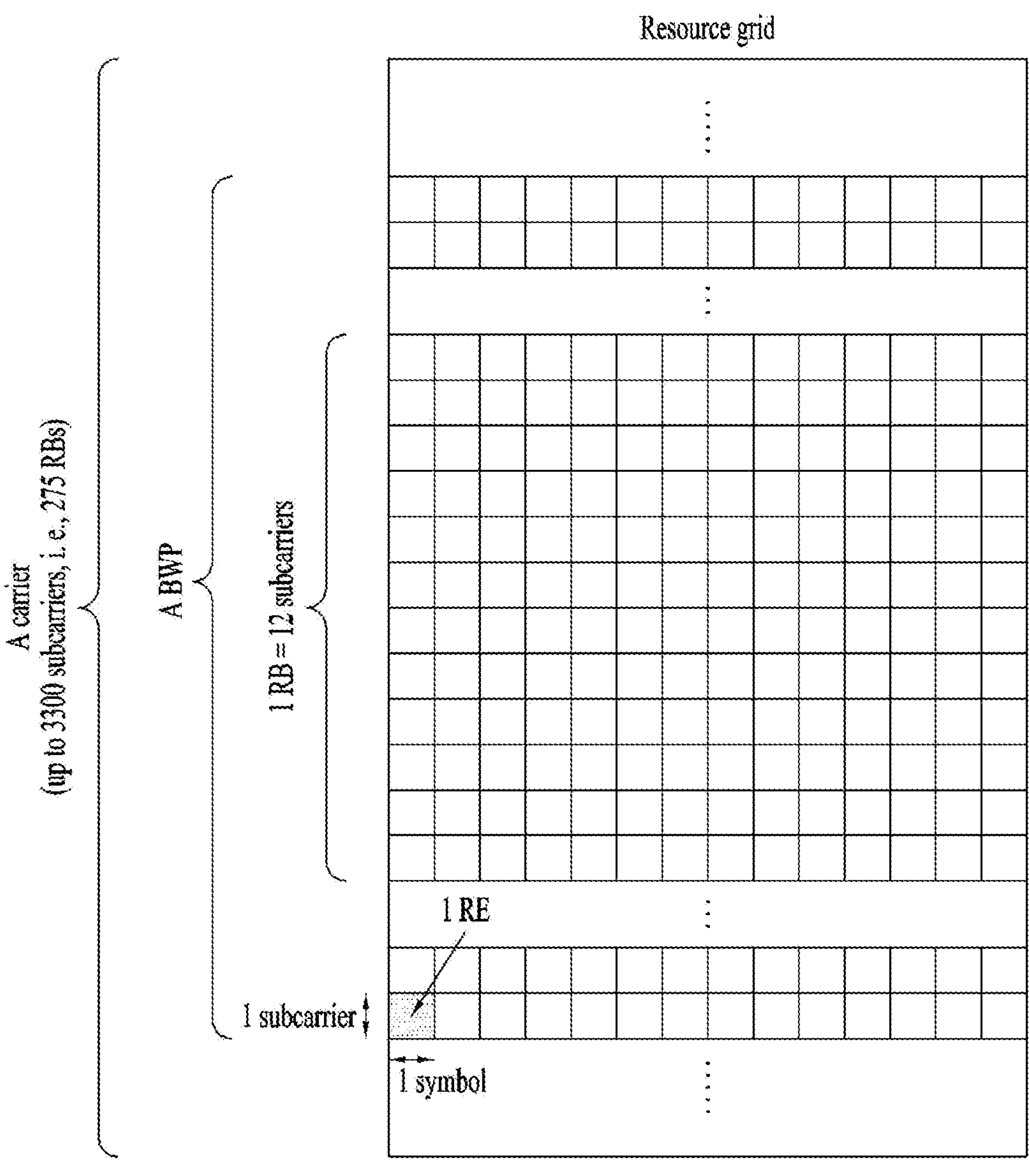
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
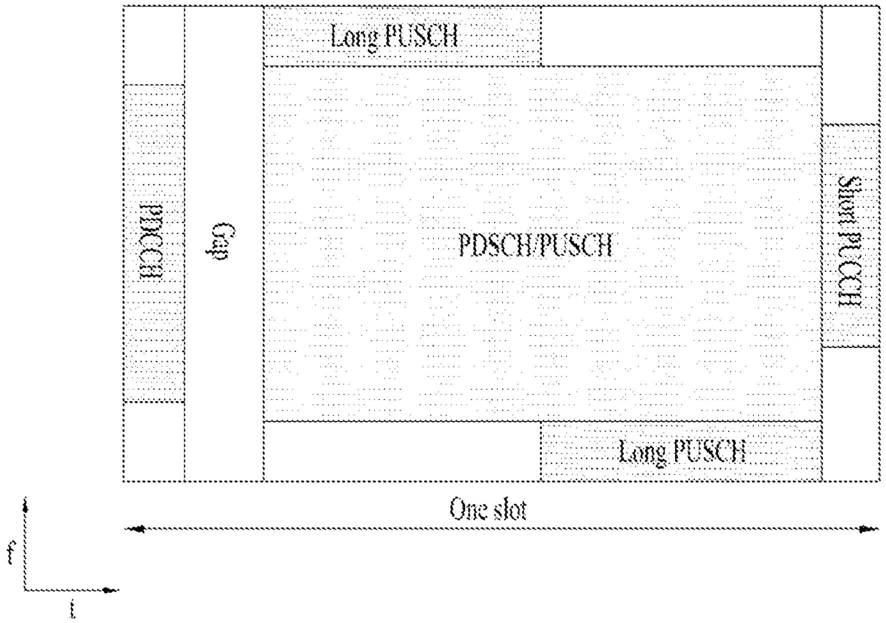
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
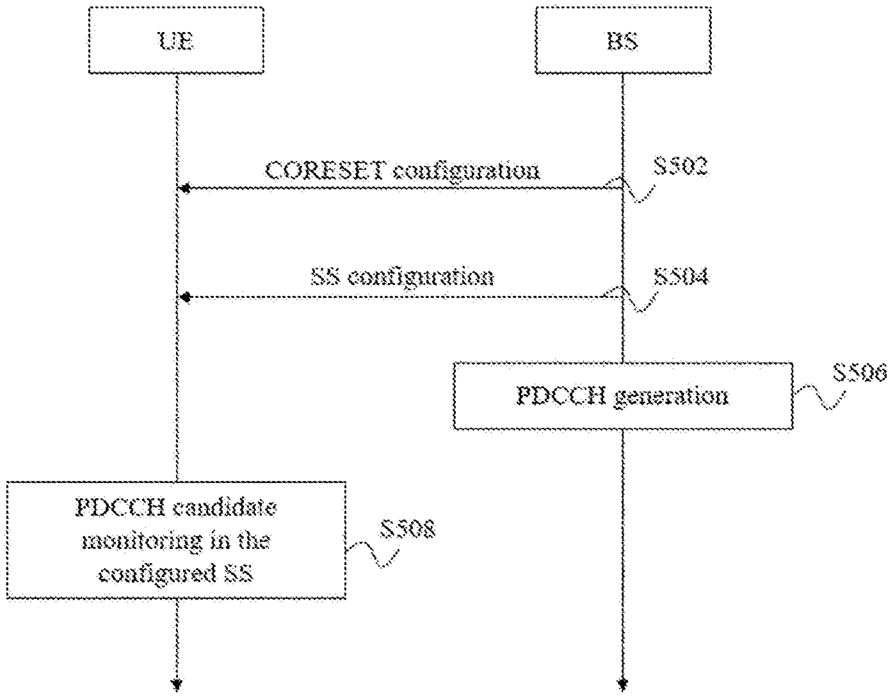
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. System information (SIB1) broadcast in a cell includes cell-specific PDSCH configuration information, PDSCH-ConfigCommon. PDSCH-ConfigCommon includes a list (or look-up table) of parameters related to a time-domain resource allocation, pdsch-TimeDomainAllocationList. Each pdsch-TimeDomainAllocationList may include up to 16 entries (or rows) each being joint-encoded {K0, PDSCH mapping type, PDSCH start symbol and length (SLIV)}. Aside from (additionally to) pdsch-TimeDomainAllocationList configured through PDSCH-ConfigCommon, pdsch-TimeDomainAllocationList may be provided through a UE-specific PDSCH configuration, PDSCH-Config. pdsch-TimeDomainAllocationList configured UE-specifically has the same structure as pdsch-TimeDomainAllocationList provided UE-commonly. For K0 and an SLIV of pdsch-TimeDomainAllocationList, the following description is referred to.

Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

- controlResourceSetId: Indicates the ID of a CORESET.
- frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.
- duration: Indicates the time-domain resources of the CORESET. It indicates the number of consecutive OFDM symbols included in the CORESET. The duration has a value between 1 and 3.
- cce-REG-MappingType: Indicates a control channel element (CCE)-to-REG mapping type. An interleaved type and a non-interleaved type are supported.
- interleaverSize: Indicates an interleaver size.
- pdcch-DMRS-ScramblingID: Indicates a value used for PDCCH DMRS initialization. When pdcch-DMRS-ScramblingID is not included, the physical cell ID of a serving cell is used.
- precoderGranularity: Indicates a precoder granularity in the frequency domain.
- reg-BundleSize: Indicates an REG bundle size.
- tci-PresentInDCI: Indicates whether a transmission configuration index (TCI) field is included in DL-related DCI.
- tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

- searchSpaceId: Indicates the ID of an SS.
- controlResourceSetId: Indicates a CORESET associated with the SS.

monitoringSlotPeriodicityAndOffset: Indicates a periodicity (in slots) and offset (in slots) for PDCCH monitoring.

monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: Indicates the number of PDCCH candidates (one of values 0, 1, 2, 3, 4, 5, 6, and 8) for each AL where AL={1, 2, 4, 8, 16}.

searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
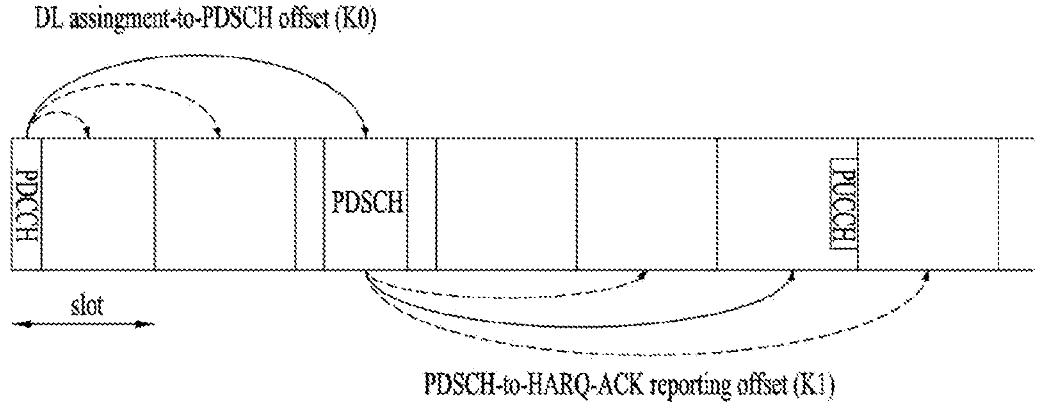
FIG. 6 illustrates an exemplary physical downlink shared channel (PDSCH) reception and acknowledgement/negative acknowledgement (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1), and indicates a DL assignment-to-PDSCH offset, K0 and a PDSCH-HARQ-ACK reporting offset, K1. For example, DCI format 1_0 or DCI format 1_1 may include the following information.

Frequency domain resource assignment: Indicates an RB set allocated to a PDSCH.

Time domain resource assignment: Indicates K0 (e.g., slot offset), the starting position (e.g., OFDM symbol index) of the PDSCH in slot #n+K0, and the duration (e.g., the number of OFDM symbols) of the PDSCH. As described above, a row index of pdsch-TimeDomainAllocationList provided UE-commonly or UE-specifically may be indicated by a TDRA field.

PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 7:
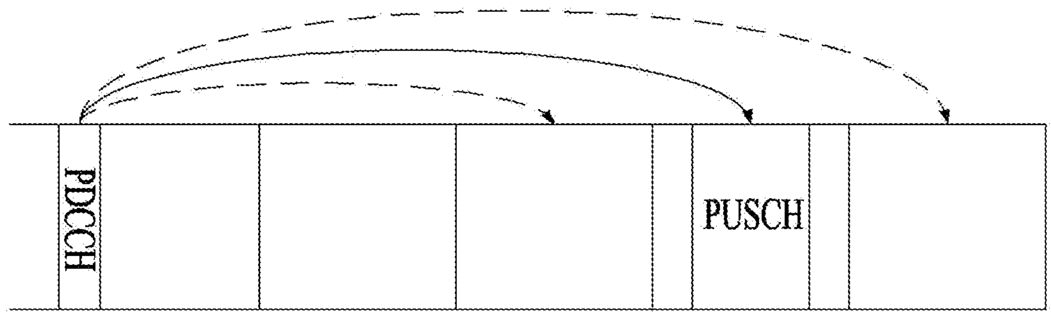
FIG. 7 illustrates an exemplary physical uplink shared channel (PUSCH) transmission process.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

DRX (Discontinuous Reception)

(1) RRC_CONNECTED DRX

Figure 8:
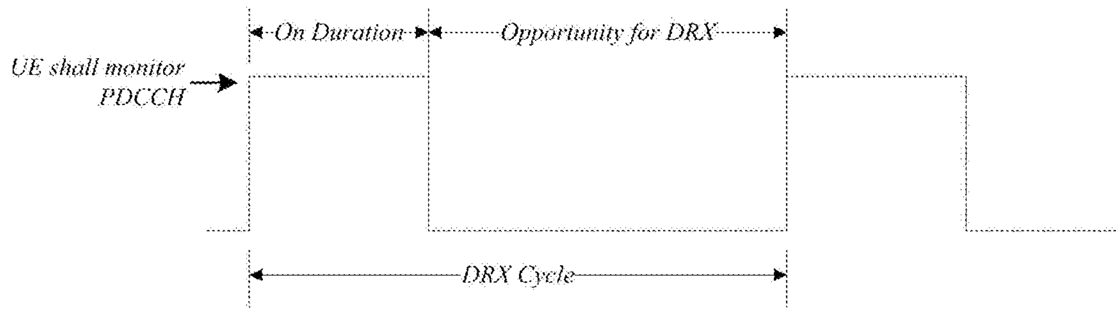
FIGS. 8 to 10 are diagrams illustrating DRX-related operations.

FIG. 8 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 8, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 5

| | Type of signals | UE procedure |
|---|---|---|
| 1st step | RRC signalling (MAC-CellGroupConfig | Receive DRX configuration information |

TABLE 5-continued

| | Type of signals | UE procedure |
|---|---|---|
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

RRC_IDLE DRX

In the RRC_IDLE and RRC_INACTIVE states, DRX is used to receive a paging signal discontinuously. For simplicity, DRX performed in the RRC_IDLE (or RRC_INACTIVE) state will be referred to as RRC_IDLE DRX.

Therefore, if DRX is configured, PDCCH monitoring/reception may be performed discontinuously in the time domain in performing the above-described/proposed procedures and/or methods are performed.

Figure 9:
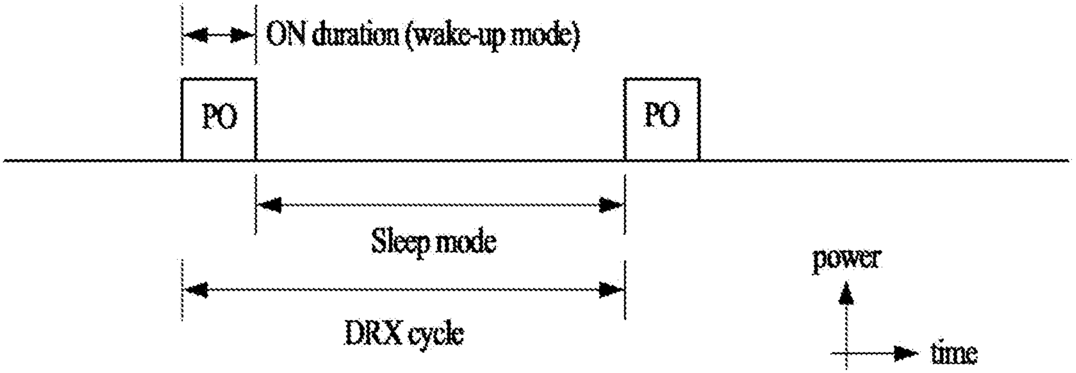

FIG. 9 illustrates an exemplary DRX cycle for paging.

Referring to FIG. 9, DRX may be configured for discontinuous reception of a paging signal. The UE may receive DRX configuration information from the BS by higher-layer (e.g., RRC) signaling. The DRX configuration information may include configuration information related to a DRX cycle, a DRX offset, a DRX timer, and the like. The UE repeats an On duration and a Sleep duration according to the DRX cycle. The UE may operate in a wakeup mode during the On duration and in a sleep mode during the Sleep duration.

In the wakeup mode, the UE may monitor a PO to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) on a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information on a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the above-described procedures and/or methods.

Figure 10:
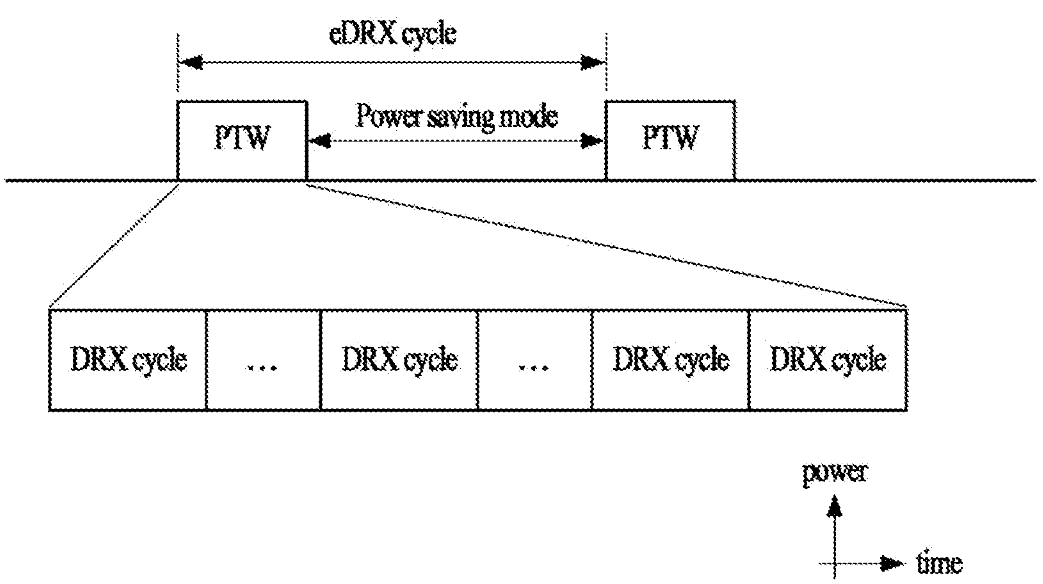

FIG. 10 illustrates an extended DRX (eDRX) cycle.

According to the DRX cycle configuration, the maximum cycle duration may be limited to 2.56 seconds. However, in the case of a UE that intermittently performs data transmission/reception, such as an MTC UE or an NB-IoT UE, unnecessary power consumption may occur during the DRX cycle. In order to further reduce the power consumption of the UE, a method of significantly extending the DRX cycle based on a power saving mode (PSM) and a paging time window or paging transmission window (PTW) has been introduced. The extended DRX cycle is simply referred to as an eDRX cycle. Specifically, paging hyper-frames (PHs) are periodically configured based on the UE ID, and a PTW is defined in the PHs. The UE may perform a DRX cycle in the PTW duration to switch to the wakeup mode on the PO thereof to monitor the paging signal. One or more DRX cycles (e.g., wake-up mode and sleep mode) of FIG. 9 may be included in the PTW duration. The number of DRX cycles in the PTW duration may be set by the BS through a higher layer (e.g., RRC) signal.

Dynamic Adjustment for DRX Parameter(s)

As described above, in the NR system, the operation of the DRX may be used to reduce unnecessary power consumption by the UE. Two DRX structures are defined, one for UEs in the RRC_IDLE state and one for UEs in the RRC_CONNECTED state, and both DRX structures are designed to reduce unnecessary power consumption during other intervals by defining periodic intervals during which the UE may expect to receive a DL signal. For C-DRX (i.e. DRX applied to a UE in the RRC_CONNECTED state), the start position of the on-duration is periodically defined based on the Rel-16 standard of the NR. In this case, the size of the cycle that may be configured (i.e. DRX cycle) may be determined by a higher layer parameter provided by the BS to the UE. Table 6 is an excerpt from the TS 38.331 standard and shows part of the information about the parameters that determine the cycle of the C-DRX. As shown in Table 6 below, the BS may indicate one or two types of DRX (e.g., long and short) to the UE, and both types of DRX cycles have a fixed integer size.

TABLE 6

```
drx-LongCycleStartOffset      CHOICE {
  ms10                       INTEGER(0..9),
  ms20                       INTEGER(0..19),
  ms32                       INTEGER(0..31),
  ms40                       INTEGER(0..39),
  ms60                       INTEGER(0..59),
  ms64                       INTEGER(0..63),
  ms70                       INTEGER(0..69),
  ms80                       INTEGER(0..79),
  ms128                      INTEGER(0..127),
  ms160                      INTEGER(0..159),
  ms256                      INTEGER(0..255),
  ms320                      INTEGER(0..319),
  ms512                      INTEGER(0..511),
  ms640                      INTEGER(0..639),
```

TABLE 6-continued

```
ms1024              INTEGER(0..1023),
ms1280              INTEGER(0..1279),
ms2048              INTEGER(0..2047),
ms2560              INTEGER(0..2559),
ms5120              INTEGER(0..5119),
ms10240              INTEGER(0..10239)
},
shortDRX    SEQUENCE {
  drx-ShortCycle    ENUMERATED {ms2, ms3, ms4, ms5, ms6,
ms7, ms8, ms10, ms14, ms16, ms20, ms30, ms32, ms35, ms40,
ms64, ms80, ms128, ms160, ms256, ms320, ms512, ms640, spare9,
spare8, spare7, spare6, spare5, spare4, spare3, spare2, spare1 },
     drx-ShortCycleTimer   INTEGER (1 .. 16)
  }           OPTIONAL, -- Need R
```

Various scenarios and candidate technologies are under discussion in 3GPP for the purpose of supporting XR services. In general, in XR, low latency is required while ensuring high data rates, and high power consumption of the UE is expected. Therefore, various power saving techniques are under consideration to increase battery efficiency. In order to avoid unnecessary power consumption of the UE, XR UEs may also consider situations where the DRX operation is applied.

However, the DRX operation defined in the existing NR standard may not be suitable for some traffic characteristics in XR. For example, in the case of XR, the requirement may include the number of frames transmitted per second (i.e. fps) for the transmission and reception of image information, which means that for an XR service with a requirement of X fps, a DRX configuration that allows the UE to transmit and receive traffic with a periodicity of at least 1/X see should be ensured. However, for the fps requirements currently being considered for XR services (e.g., 30, 60, 90, and 120 fps), the values of the periodicities at which frames are to be transmitted are rational numbers. On the other hand, for the size of the DRX cycle supported by the current NR standard, only integers are supported as the size, which may not be appropriate. For example, if a short DRX cycle of 16 ms, which is closest to the size of 1/60 sec, is to be applied to support XR service of 60 fps, the residual offset caused by the difference between the two cycles may gradually accumulate, resulting in a gap between the start position of the on-duration expected by the UE and the position where the XR traffic should be transmitted.

To address this issue, the present disclosure proposes a method whereby the BS indicates changes to the DRX parameters through a dynamic indication (e.g., DCI or MAC CE) and the UE receives the indication and performs a related operation. The proposed method may be advantageous in performing DRX operations without increasing latency while improving power consumption efficiency for services (e.g., XR) whose traffic cycles are difficult to support using existing (Rel-15/16/17 NR) DRX cycles. The proposed method may also be advantageous for preparing for changes in the timing of traffic generation and transmission and reception caused by the occurrence of jitter.

The following discussion focuses on situations where the operation of C-DRX is applied to a UE in the RRC_CONNECTED state based on the 3GPP NR system, but it should be noted that the proposed methods are applicable to other methods (e.g., DRX applied to a UE in the RRC_IDLE state) in which durations during which a UE does not need to expect to receive DL signals may be defined with periodicity. Hereafter, the term DRX is used as a general concept that covers the term C-DRX.

While the following description assumes a DRX structure in which the duration in which the UE starts PDCCH monitoring is repeated periodically, embodiments are not limited thereto. The proposed methods may be applied even to DRX operations with a non-periodic structure. For example, they may be applied to a DRX operation with non-integer periodicity or a DRX operation for which the size of the DRX cycle is presented in the form of a pattern.

Although NR systems and XR services are described below as examples, the proposed methods are not limited thereto and may be applied to all wireless communication transmission and reception structures and services. One or more of the proposed methods may be applied in combination, or may be applied independently without any combination. Terms, symbols, sequences, etc. used in the description may be replaced by other terms, symbols, sequences, etc.

According to one embodiment, a method is proposed by which the BS provides indication information for dynamic adjustment of C-DRX parameters using L1 and/or L2 signaling (e.g., DCI or MAC), and the UE performs an operation within the on-duration time/active time for PDCCH monitoring, etc. based on the received information. Furthermore, methods for preventing malfunctions that may occur when the UE fails to receive the dynamic indication information provided by the BS are proposed.

For simplicity, a case is considered where the UE performs a C-DRX (hereinafter DRX) operation in the RRC Connected state is described. In this case, the UE may receive an indication that the on-duration timer may be started with periodicity of DRX cycle, and may perform operations such as PDCCH monitoring with this periodicity.

[Proposal 1] Dynamic Adjustment of DRX Using Offset Field and DCC Filed

When the UE performs a DRX operation, the start position of an on-duration of the next DRX cycle following a specific DRX cycle may be adjusted according to a readjustment indication of a DRX parameter indicated by dynamic indication information in the on-duration (or active time) of the specific DRX cycle. In this case, the indication information may represent information indicated by L1/L2 signaling, such as DCI or MAC, which may be transmitted by the BS and received by the UE. Here, the start position of the on-duration may mean the position at which the on-duration timer starts. The readjustment indication of the DRX parameter may be, for example, a value of an offset for adjusting the start position of the on-duration timer. Suppose that the start position of the on-duration timer for a specific DRX cycle is slot #n and the length of the DRX cycle is set to T slots. In this case, if the indication information received within the active time starting at slot #n indicates an offset of +1 slot, the UE may assume that the on-duration of the next DRX cycle will start at the position of slot #(n+T+1) and perform related operations. While the following discussion focuses on dynamically indicating the value of the offset described above, Proposal 1 may be applied to other methods that have the same/similar effect (e.g., adjusting the DRX cycle using dynamic indication information).

According to one embodiment, a method is proposed in which a field providing information for indicating an offset in the dynamic indication information transmitted between a BS and a UE for adjustment of a dynamic DRX parameter (hereinafter referred to as an offset field) and a field for signaling whether or not a dynamic instruction has been executed or the number of times of the execution (hereinafter referred to as a dynamic change control (DCC) field) are configured.

The information that the offset field indicates and the corresponding operation may be summarized as follows.

The size of the offset field may be determined by the number of offsets that can be indicated. The size of the offset field may be defined by a standard or may be a value that is set by the BS for the UE through a higher layer signal (e.g. SIB or RRC).

The offset field shall indicate its value only when the start position of the on-duration of the next DRX cycle is adjusted within the active time of a specific DRX cycle; otherwise, it shall indicate 0. For example, if an offset adjustment is indicated in the n-th DRX cycle and no offset adjustment is indicated in the n+1-th DRX cycle, the offset filed transmitted and received in the n-th DRX cycle may indicate a non-zero offset value, and the offset field transmitted and received in the n+1-th DRX cycle may indicate 0.

If the value of the offset used to determine the start position of the on-duration of a specific DRX cycle in which the offset field is transmitted and received is m slots, and an offset value equal to n slots is indicated within the active time of the same DRX cycle as above, the UE may use an offset equal to the size of m+n to determine the start position of the on-duration of the next DRX cycle.

If the value of the offset used to determine the start position of the on-duration of the specific DRX cycle in which the offset field is transmitted and received is m slots, and the UE has not received a separate offset indication within the active time of the same DRX cycle as above, the UE may maintain and use the offset of the size m to determine the start position of the next on-duration.

The above proposed configuration and operation of the offset field provides a structure in which the indicated offset value is accumulated and applied, and the representation of the offset indication information is reset every DRX cycle. Such an approach may provide an advantageous structure when the start position of a DRX cycle needs to be maintained semi-permanently by a specific event (e.g., the non-integer traffic periodicity of XR traffic is reflected, or the occurrence cycle of traffic is shifted and maintained), and is also advantageous in that the range of values of the indicatable offset is guaranteed to be the same for every DRX cycle.

If the above proposed configuration and operation of the offset field is used, issues may arise when the UE fails to obtain a dynamic indication. For example, the BS may transmit an indication of a change of the offset through the offset field and apply the changed value of the offset from the next DRX cycle. However, if the UE fails to obtain this indication, the UE may fail to reflect the changed value of the offset. In other words, if the BS transmits L1/L2 signaling to the UE that includes an offset change indication, but the UE fails to detect the L1/L2 signaling, an inconsistency in the start position of the DRX on-duration may occur between the UE and the BS. As a more specific example, in FIG. 11, if the UE misses the DCI in the n+2th DRX cycle, the UE may incorrectly assume that the on-duration starts in the n+3th DRX cycle based on the accumulated offset equal to 2. To address this issue, it is proposed that the DCC field be used in L1/L2 signaling that provides dynamic offset change indication information, e.g., DCI or MAC. The DCC field may be a value related to the accumulation of the number of times the start of the on-duration of the DRX cycle has been dynamically adjusted. Based on the value of the DCC field, the UE may recognize that it has missed DCI/MAC that includes an Add offset field. For example, if the most recent DCC value known to the UE is k, and the value of the Add offset field in the currently received DCI is 0, indicating no offset change, but the DCC field in the currently received DCI has a value (e.g., k+1) other than k, the UE may recognize that it has missed DCI containing the DCC field equal to k+1 and a non-zero Add offset at least once in the past. As another example, if the most recent DCC value known to the UE is k, and the value of the Add offset field in the currently received DCI is non-zero, indicating an offset change, but the value of the DCC field in the currently received DCI is not k+1 (e.g., the value is k+2), the UE may recognize that it has missed DCI containing the DCC field equal to k+1 and a non-zero Add offset at least once in the past.

The information indicated by the DCC field and the operation of the field may be summarized as follows.

The DCC field may consist of M bits, the size of which may be defined by a standard or a value set by the BS for the UE through a higher layer signal (e.g. SIB or RRC) may be used.

The DCC field may be set to have a state change in its value only when the start position of the on-duration of the next DRX cycle is adjusted within the active time of a specific DRX cycle. Otherwise, the DCC field shall remain in the previously transmitted and received state.

If M=1, the DCC filed operates as a 1-bit toggling bit, representing a state change from 0 to 1 or 1 to 0 only if a non-zero value is indicated by the offset field.

If M>1, the DCC field may represent the state value in the range of integer values between 0 and 2M−1.

i. If a non-zero value is indicated by the offset field while the state of the DCC field has an integer of m, the state value of the DCC field transitions to a value of (m+1) mod 2.

ii. If 0 is indicated by the offset field as a value while the state of the DCC field has an integer of m, the state value of the DCC field shall maintain the state of m.

iii. The DCC field may be configured to express the state value represented by the integer in the form of a binary number.

According to the above proposed configuration and operation of the DCC filed, information on whether an indication of a change in offset has been issued is provided to the UE through the offset field, and thus the UE may recognize the offset change indication even when it fails to receive signaling, e.g., DCI or MAC, containing the offset change indication.

While the foregoing description assumes that the UE transmits and receives a dynamic indication of the offset change is transmitted and received while the on-duration timer starts and active time is maintained, Proposal 2 may be applied and used in a duration other than the above duration (e.g. outside active time). For example, Proposal 2 may be applied even when the on-duration of a specific DRX cycle is set to a position ahead of the start position and a WUS (i.e., DCI format 2_6 scrambled with PS-RNTI) monitored in an interval outside the active time is used.

FIG. 11 is a diagram illustrating dynamic adjustment of DRX on-duration according to an embodiment. For simplicity, FIG. 11 illustrates that dynamic signaling is performed using L1 signaling (e.g., DCI/PDCCH). However, dynamic adjustment may be performed using L2 signaling (e.g., MAC CE) carrying DCC and Add offset information as described above.

Referring to FIG. 11, an indication to change the offset between the start of the DRX cycle and the start position of the on-duration (and/or on-duration timer) (i.e., a non-zero add offset value) is generated in the nth DRX cycle and the n+2th DRX cycle. Specifically, the add offset field is set to a value other than 0 in the nth DRX cycle and the n+2$^{th}$ DRX cycle in which the +2 add offset change indication and the −1 add offset are generated. The add offset value indicated through the DCI of the i$^{th}$ DRX cycle is applied and maintained from the i+1$^{th}$ DRX cycle. Also, the state of the DCC field is changed/transitioned only when an offset change indication is generated (i.e., non-zero add offset value is given). In FIG. 11, the state change/transition of the DCC field occurs in the nth DRX cycle and the n+2$^{th}$ DRX cycle. If the indication of change to the offset is not generated (i.e., zero add offset value is given), the previous state of the DCC field may be maintained. For example, since add offset=0 in the n+1$^{th}$ DRX cycle, the DCC field value of k in the nth DRX cycle is set/remained as the DCC field value in the n+1$^{th}$ DRX cycle.

[Proposal 2] Repeatedly Provide Offset Change Information

When Proposal 1 described above is used, the UE may obtain the offset change indication for the next DRX cycle within the duration in which the on-duration timer starts and the active time is maintained. In particular, the proposed method may be advantageous in that if the UE fails to receive the dynamic indication transmitted by the BS, the UE may recognize the missed reception of the offset indication. Once the UE recognizes the missed reception of the dynamic indication, the UE may report the status of the missed dynamic indication to the BS and methods for adjusting the dynamic indication may be carried out. In order to prevent further operations of the UE from occurring due to the missed reception of the dynamic indication, a method for ensuring an opportunity for the UE to receive the dynamic indication provided by the BS is proposed. In Proposal 2, the DCC field described in Proposal 1 above may be omitted.

According to one embodiment, a time duration during which the UE is to receive the dynamic indication may be provided, wherein the time duration may have a start point and an end point, and the start point may periodically repeated. For example, the time duration may be a duration of active time that is maintained after the start of the on-duration timer. In this case, the change indication for the offset may be defined to operate under the following conditions based on the time duration during which the active time in each DRX cycle is maintained.

- If an offset change indication for the next DRX cycle is generated within a certain active time and the transmission and reception of the same is needed, the BS may be configured to transmit the offset change indication repeatedly within the corresponding active time, and the UE may receive the information assuming such BS operation.
- It may be defined that the offset change for the next DRX cycle is allowed only once within a specific active time. If the state of the offset filed and the DCC field has changed at least once within a specific active time, the UE may expect that the changed state information in the offset filed and the DCC field will remain unchanged within the active time.

According to Proposal 2, the UE may be provided with an opportunity to repeatedly receive the indication of the offset change for the next DRX cycle within the active time, and therefore the probability of transmitting and receiving the offset change indication and the stability of the operation may increase.

While the foregoing description considers a structure in which the UE transmits and receives a dynamic indication of an offset change while the on-duration timer is started and active time is maintained, Proposal 2 may be applied and used outside the above duration (e.g., outside the active time). For example, the proposed method may be applied and used even when the on-duration of a specific DRX cycle is set to a position ahead of the start position and a WUS (i.e., DCI format 2_6 scrambled with PS-RNTI) monitored in an interval outside the active time is used. In this case, the UE may be configured to assume that the dynamic indication information for the offset change is allowed to be changed only once within the interval of the WUS monitoring window and that the same value will be maintained after the change, even if the WUS is repeatedly transmitted.

[Proposal 3] Initialization and Reconfiguration of Offset Change Information

As described above, missing offset change indication may cause inconsistencies in the understanding of DRX operation between the BS and the UE. Therefore, a method for addressing this inconsistency/missing issue may be needed for the BS and the UE. If the issue is not corrected, the UE may lose the opportunity to receive a PDCCH transmitted by the BS and/or a delay may occur due to traffic not being served at the required time of transmission or reception. As a specific example, in FIG. 11, if the UE misses the DCI in the n+2th DRX cycle, the UE may incorrectly assume that the on-duration starts in the n+3th DRX cycle based on the accumulated offset equal to 2. However, in fact, the on-duration of the n+3th DRX cycle has been changed to start based on the accumulated offset equal to 1, and if the n+3th DCI is transmitted at the start of the on-duration of the n+3th DRX cycle, the UE may fail to transmit or receive the n+3th DCI and a signal scheduled thereby. Considering these issues, a method for initializing and reconfiguring a DRX parameter for which a change indication may be dynamically provided for the BS and the UE is proposed. When the DRX parameters are initialized, the DRX operation may be performed based on the initial parameter values in the DRX-related configuration provided through higher layer signaling, and the accumulated offset value of the DRX on-duration whose start was adjusted through dynamic signaling in the past may be reset (e.g., to 0). Once the DRX parameter is reconfigured, the DRX-related configuration previously provided through higher layer signaling may be discarded and a new DRX-related configuration may be provided through higher layer signaling.

According to one embodiment, a method is proposed by which a UE initializes a configured DRX parameter or receives a reconfiguration thereof at a certain time when a specific condition is satisfied. Here, the DRX parameter may refer to a parameter that may be changed by a dynamic indication of the BS. As an example, an offset value for the start position of an on-duration timer is described. In this case, one or more of the following detailed methods may be used for the above specific condition.

(Option 3-1-A) The BS may reconfigure the DRX parameter for the UE using RRC. In this case, the specific condition under which the DRX parameter is reconfigured may be reception of an RRC signal for the purpose of (re)configuring the DRX parameter by the UE, or transmission or reception of a HARQ-ACK for the PDSCH on which the information is transmitted or received.

(Option 3-1-B) The BS may indicate to the UE reconfiguration or initialization of the DRX parameter using the MAC. In this case, the specific condition under which the DRX parameter is reconfigured may be reception by the UE of a MAC layer signaling for the purpose of (re)configuring the DRX parameter, or transmission or reception of a HARQ-ACK for a PDSCH on which the corresponding information is transmitted or received. If initialization of the DRX parameter is indicated, it may be information distinguished by MAC CE. For example, the BS may inform the UE in advance that the DRX parameter may be initialized through a specific MAC CE. If the MAC CE is transmitted or received, the UE may perform a relevant operation, determining that the condition for initializing the DRX parameter has been satisfied.

(Option 3-1-C) The BS may indicate to the UE the initialization of the DRX parameter using DCI. To this end, specific DCI may contain information indicating the initialization of the DRX parameter. For example, the indication information may be included in the DCI providing the dynamic indication information of the DRX parameter. More specifically, the initialization information may be provided through a specific state of the offset field or the DCC field, or a combination of both fields.

(Option 3-1-D) The BS and the UE may expect the initialization of the DRX parameter to occur periodically without separate indication and may perform related operations periodically. To this end, the BS may determine the periodicity at which the initialization is performed and its reference time, and provide the corresponding information to the UE through a higher layer signal (e.g. RRC).

The specific time at which the DRX parameter is initialized or reconfigured may be determined as the time at which the UE transmits or receives information indicating the same, or the time at which the transmission or reception of a HARQ-ACK for the received information occurs, or the end of the active time of the current DRX cycle (or from the start of the next on-duration).

Proposal 3 may include a method by which the UE may request the initialization or reconfiguration of the DRX parameter as needed. This may be to provide a mechanism for the UE to request a correction to the BS if it recognizes a missing dynamic change indication for the DRX parameter. To initialize or reconfigure the DRX parameter, the UE may make the request to the BS using one of HARQ-ACK, SR, or an uplink transmission signal or channel of the RACH procedure.

Figure 12:
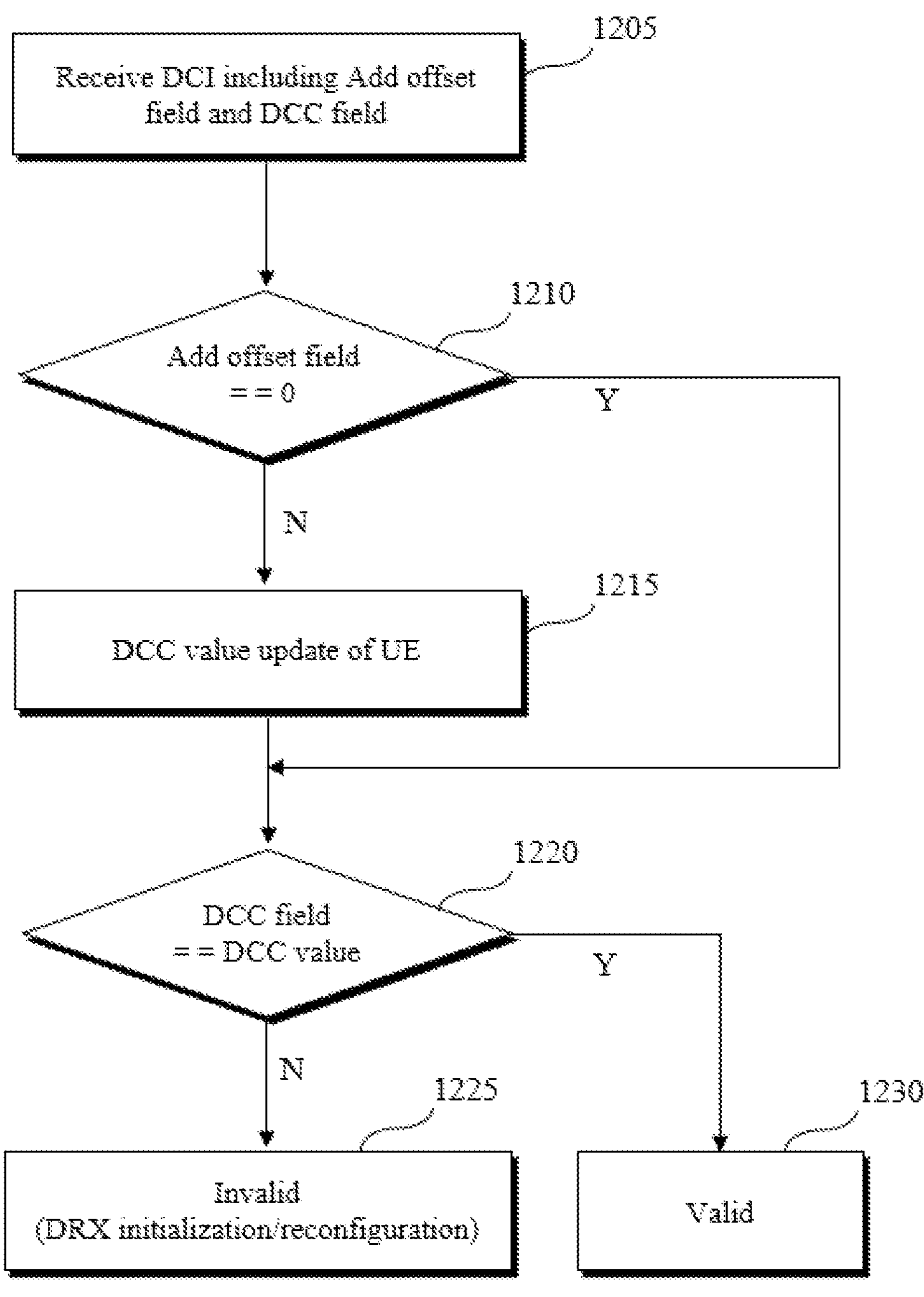
FIG. 12 is a diagram illustrating a validation procedure related to dynamic adjustment of DRX on-duration according to an embodiment.

FIG. 12 is a diagram illustrating a validation procedure related to dynamic adjustment of DRX on-duration according to an embodiment. The validation procedure may include determining whether signaling indicating a dynamic offset change is missing based on the DCC field described in Proposal 1.

Referring to FIG. 12, the UE receives DCI containing an Add offset field and a DCC field (1205).

The UE checks whether the Add offset field is zero or non-zero (i.e., an offset change indication) (1210).

If the Add offset field is non-zero (i.e., an offset change indication) (1210, N), the UE updates the most recent DCC value/state that the UE knows (1215). For example, if the most recent DCC value known by the UE prior to receiving the current DCI is k, the UE may update the value to k+1.

The UE compares the value of the DCC field contained in the currently received DCI 1205 with the DCC value/state of the UE to determine whether they match (1220).

If the value of the DCC field contained in the DCI 1205 and the DCC value/state of the UE are the same, the UE may determine that the accumulated value and number of offset changes (DCC value) that the UE knows is valid (1230), and may determine the start of the on-duration in the next DRX cycle based on the DCI 1205.

If the value of the DCC field contained in the DCI 1205 and the DCC value/state of the UE do not match, the UE may determine that the accumulated value and number of offset changes (DCC value) that the UE knows is invalid, and may perform a DRX initialization or reconfiguration (1225).

Figure 13:
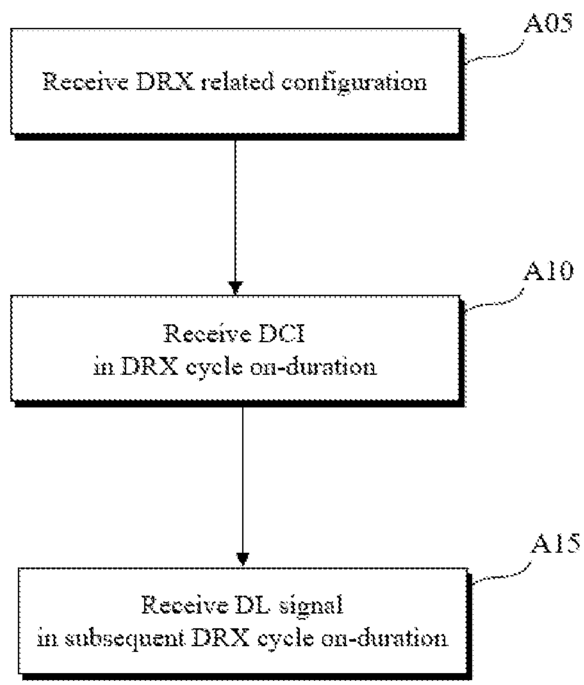
FIG. 13 illustrates a flow of a signal reception method for a terminal according to one embodiment.

FIG. 13 illustrates a flow of a signal reception method for a UE according to one embodiment.

Referring to FIG. 13, the UE may receive a discontinuous reception (DRX) related configuration through higher layer signaling (A05).

The UE may receive downlink control information (DCI) in an on-duration of a DRX cycle based on the DRX related configuration (A10). An on-duration of a subsequent DRX cycle may be configured based on the DCI. The DCI may include at least one of first information for adjusting a start of the on-duration of the subsequent DRX cycle and second information related to an accumulation of the number of times the start of the on-duration of the subsequent DRX cycle has been adjusted.

The first information may be related to an offset from a start of the subsequent DRX cycle to the start of the on-duration. The offset may be accumulated in each DRX cycle. The first information may be related to an increment or decrement of the offset. For example, the first information may be an Add offset field.

The second information may be a modulo operation on an accumulated value of the number of times the start of the on-duration has been adjusted based on each DCI up to a current DCI. In one example, the second information may be a DCC field.

The UE may receive a downlink signal in an on-duration of a subsequent DRX cycle following the DRX cycle (A15). In one example, the downlink signal may contain subsequent DCI received in the on-duration of the subsequent DRX cycle.

The start of the on-duration of the subsequent DRX cycle may be adjustable only once for each DRX cycle.

Based on the second information, the UE may determine whether reception of preceding DCI configured to adjust the start of the on-duration of the subsequent DRX cycle has been missed. Based on the reception of the preceding DCI having been missed, an initialization or reconfiguration of the DRX related configuration may be performed.

The DCI may be related to scheduling of traffic having a non-integer periodicity.

Figure 14:
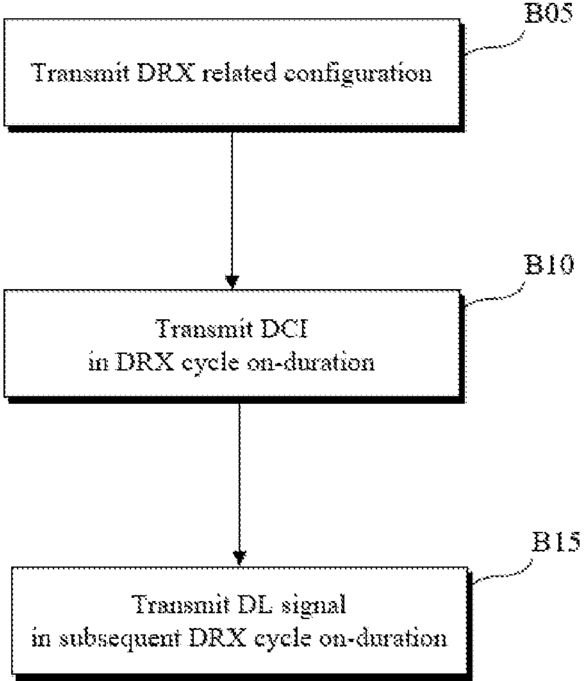
FIG. 14 illustrates a flow of a signal transmission method for a base station according to an embodiment.

FIG. 14 illustrates a flow of a signal transmission method for a BS according to an embodiment.

Referring to FIG. 14, the BS may transmit a discontinuous reception (DRX) related configuration through higher layer signaling (B05).

The BS may transmit downlink control information (DCI) in an on-duration of a DRX cycle based on the DRX related configuration (B10). An on-duration of a subsequent DRX cycle may be configured based on the DCI. The DCI may include at least one of first information for adjusting a start of the on-duration of the subsequent DRX cycle and second information related to an accumulation of the number of times the start of the on-duration of the subsequent DRX cycle has been adjusted.

The first information may be related to an offset from a start of the subsequent DRX cycle to the start of the on-duration. The offset may be accumulated in each DRX cycle. The first information may be related to an increment or decrement of the offset. For example, the first information may be an Add offset field.

The second information may be a modulo operation on an accumulated value of the number of times the start of the on-duration has been adjusted based on each DCI up to a current DCI. In one example, the second information may be a DCC field.

The BS may transmit a downlink signal in an on-duration of a subsequent DRX cycle following the DRX cycle (B15). In one example, the downlink signal may contain subsequent DCI transmitted in the on-duration of the subsequent DRX cycle.

The start of the on-duration of the subsequent DRX cycle may be adjustable only once for each DRX cycle.

Based on the preceding DCI having been missed by the UE, an initialization or reconfiguration of the DRX related configuration may be performed.

The DCI may be related to scheduling of traffic having a non-integer periodicity.

Figure 15:
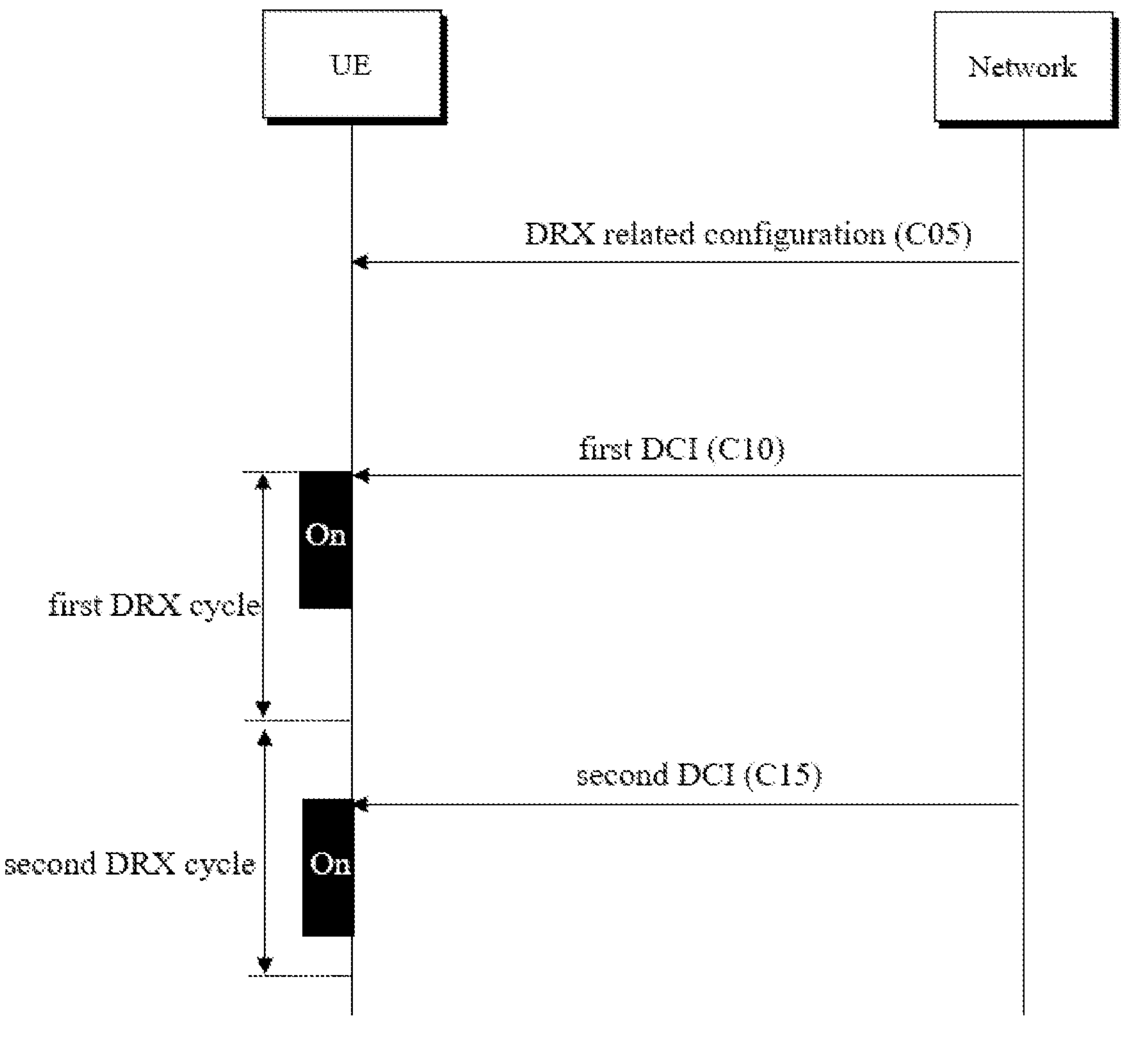
FIG. 15 illustrates a flow of a method of transmitting and receiving signals in a network system according to an embodiment.

FIG. 15 illustrates a flow of a method of transmitting and receiving signals in a network system according to an embodiment.

Referring to FIG. 15, the UE may receive a discontinuous reception (DRX) related configuration from a network through higher layer signaling (C05).

The UE may receive first downlink control information (DCI) from the network in an on-duration of a first DRX cycle based on the DRX related configuration (C10). The on-duration of the subsequent second DRX cycle may be configured based on the first DCI. The first DCI may include at least one of an Add offset field for adjusting the start of the on-duration of the subsequent second DRX cycle and a DCC field related to an accumulation of the number of times the start of the DRX on-duration has been adjusted up to the current time.

The UE may receive second DCI from the network in the on-duration of the second DRX cycle (C15). The second DCI may include at least one of an Add offset field for adjusting the start of the on-duration of a subsequent third DRX cycle and a DCC field related to the accumulation of the number of times the start of the DRX on-duration has been adjusted up to the current time.

The Add offset field may be related to an offset from the start of the DRX cycle to the start of the on-duration. The offset may be accumulated in each DRX cycle. The Add offset field may be related to an increment or decrement of the offset. The DCC field may be a modulo operation on an accumulated value of the number of times the start of the on-duration has been adjusted based on each DCI up to a current DCI.

The start of the on-duration of the subsequent DRX cycle may be adjustable only once for each DRX cycle.

Based on the DCC field, the UE may determine whether reception of preceding DCI configured to adjust the start of the on-duration of the subsequent DRX cycle has been missed.

Based on the reception of the preceding DCI having been missed, an initialization or reconfiguration of the DRX related configuration may be performed.

Each DCI may be related to scheduling of traffic having a non-integer periodicity.

Figure 16:
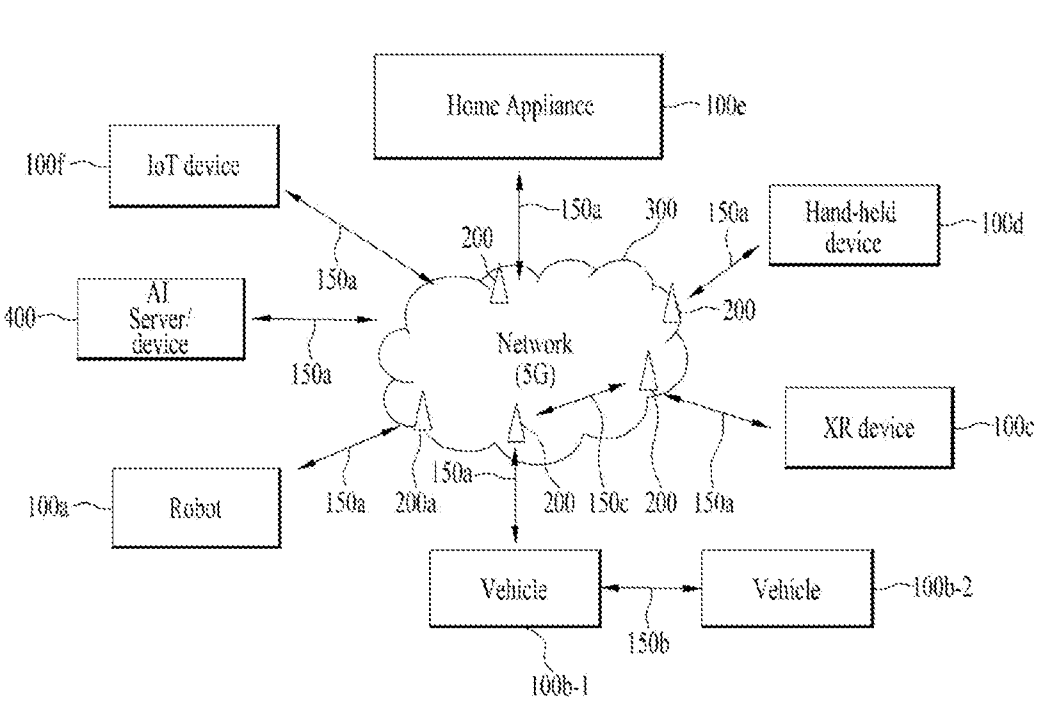
FIG. 16 to FIG. 19 illustrate an example of a communication system 1 and wireless devices applicable to the present disclosure.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
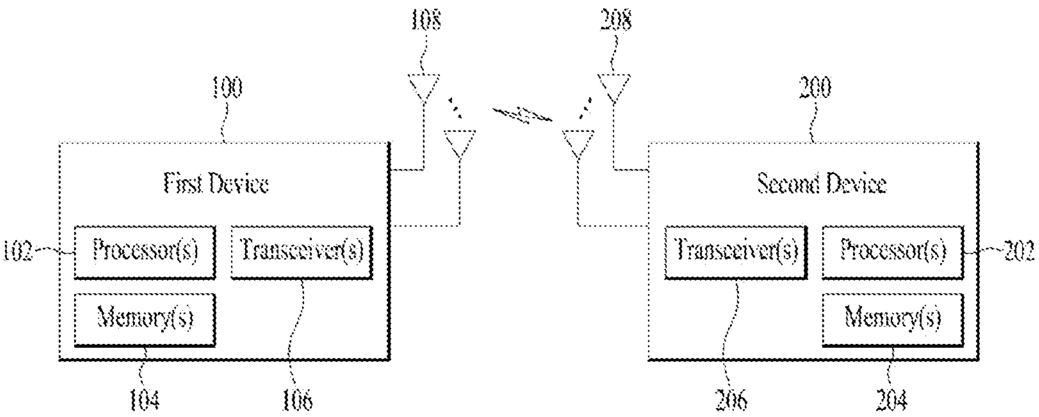

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100$x$ and the BS 200} and/or {the wireless device 100$x$ and the wireless device 100$x$} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
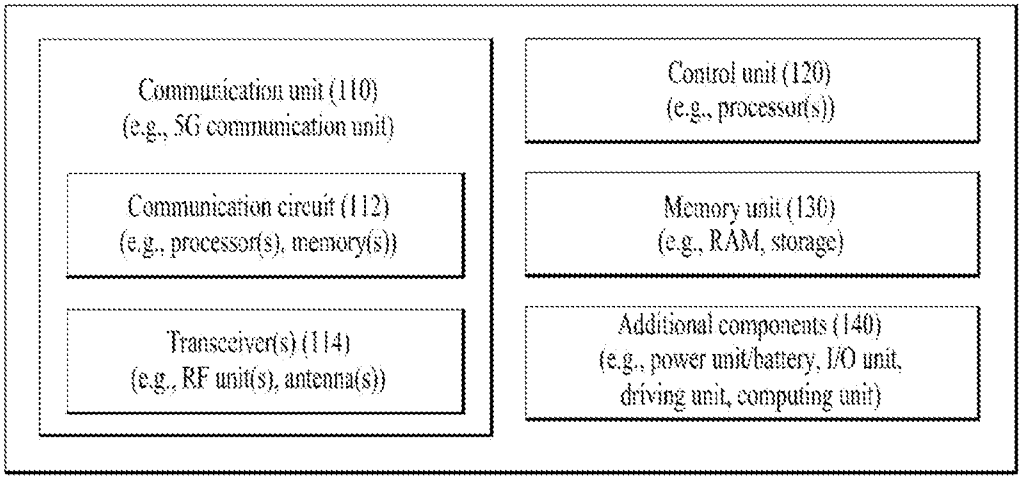

FIG. 18 illustrates another example of a wireless device applied to the present disclosure. The wireless device may be implemented in various forms according to a use-case/service (refer to FIG. 16).

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 19:
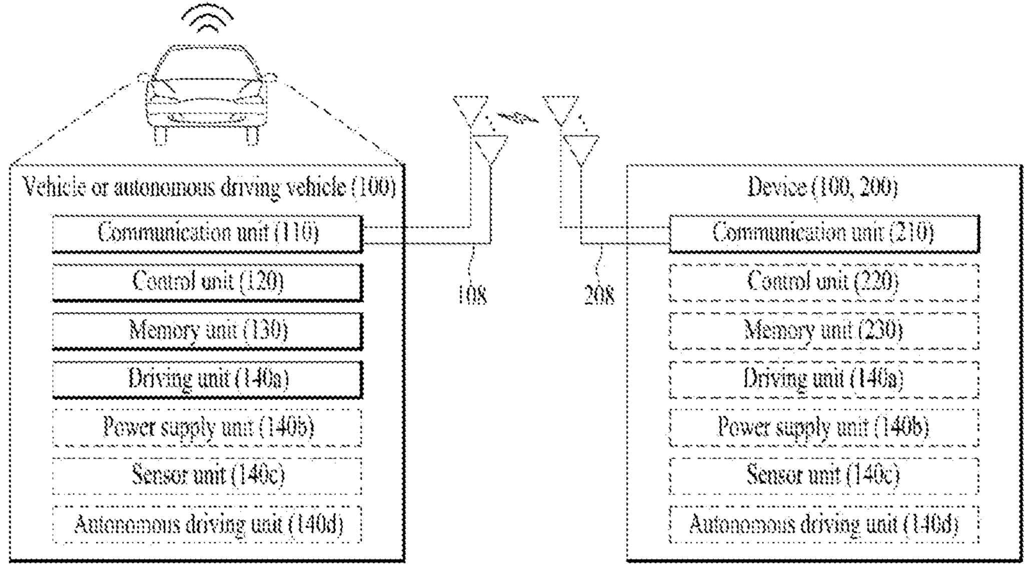

FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method performed by a user equipment (UE), the method comprising:

receiving, through higher layer signaling, a discontinuous reception (DRX) configuration including information about an on-duration of a DRX cycle;

receiving downlink control information (DCI) in the on-duration of the DRX cycle based on the DRX configuration; and receiving a downlink signal in an on-duration of a subsequent DRX cycle, wherein the DCI comprises first information for adjusting a start of the on-duration of the subsequent DRX cycle and second information regarding an accumulated number of times the start of the on-duration of the subsequent DRX cycle has been adjusted, and wherein DRX initialization or reconfiguration is performed based on that the accumulated number obtained from the second information is different from an accumulated number of times, counted by the UE, the start of the on-duration of the subsequent DRX cycle has been adjusted.

2. The method of claim 1, wherein the first information includes an offset value from the start of the subsequent DRX cycle to the start of the on-duration.

3. The method of claim 2, wherein the offset value is accumulated for each DRX cycle, and wherein the first information is related to an increment or decrement of the offset value.

4. The method of claim 1, wherein the second information includes a value determined based on a modulo operation for the accumulated number.

5. The method of claim 1, wherein the start of the on-duration of the subsequent DRX cycle is adjustable only once for each DRX cycle.

6. The method of claim 1, wherein the downlink signal comprises a subsequent DCI received in the on-duration of the subsequent DRX cycle.

7. The method of claim 1, wherein the UE transmits a request for the DRX initialization or reconfiguration based on that the accumulated number in the second information is different from the accumulated number of times counted by the UE.

8. The method of claim 1, wherein the DCI is related to scheduling of traffic having a non-integer periodicity.

9. A non-transitory processor-readable recording medium having recorded thereon a program for performing the method of claim 1.

10. A device comprising:

a memory configured to store instructions; and a processor configured to perform operations by executing the instructions, wherein the operations of the processor comprise:

receiving, through higher layer signaling, a discontinuous reception (DRX) configuration including information about an on-duration of a DRX cycle;

receiving downlink control information (DCI) in the on-duration of the DRX cycle based on the DRX configuration; and receiving a downlink signal in an on-duration of a subsequent DRX cycle, wherein the DCI comprises first information for adjusting a start of the on-duration of the subsequent DRX cycle and second information regarding an accumulated number of times the start of the on-duration of the subsequent DRX cycle has been adjusted, and wherein DRX initialization or reconfiguration is performed based on that the accumulated number obtained from the second information is different from an accumulated number of times, counted by the device, the start of the on-duration of the subsequent DRX cycle has been adjusted.

11. The device of claim 10, wherein the device is an application specific integrated circuit (ASIC) or a digital signal processing device.

12. The device of claim 10, further comprising:

a transceiver, wherein the device is a user equipment (UE) operating in a wireless communication system.

13. A method performed by a base station (BS), the method comprising:

transmitting, to a user equipment (UE), a discontinuous reception (DRX) configuration including information about an on-duration of a DRX cycle through higher layer signaling;

transmitting, to the UE, downlink control information (DCI) in the on-duration of the DRX cycle based on the DRX configuration; and transmitting, to the UE, a downlink signal in an on-duration of a subsequent DRX cycle, wherein the DCI comprises first information for adjusting a start of the on-duration of the subsequent DRX cycle and second information regarding an accumulated number of times the start of the on-duration of the subsequent DRX cycle has been adjusted, and wherein DRX initialization or reconfiguration is performed based on that the accumulated number informed through the second information is different from an accumulated number of times, counted by the UE, the start of the on-duration of the subsequent DRX cycle has been adjusted.

14. A base station (BS) comprising:

a transceiver; and a processor configured to control the transceiver to:

transmit, to a user equipment (UE), a discontinuous reception (DRX) configuration including information about an on-duration of a DRX cycle through higher layer signaling;

transmit, to the UE, downlink control information (DCI) in the on-duration of the DRX cycle based on the DRX configuration; and transmit, to the UE, a downlink signal in an on-duration of a subsequent DRX cycle, wherein the DCI comprises first information for adjusting a start of the on-duration of the subsequent DRX cycle and second information regarding an accumulated number of times the start of the on-duration of the subsequent DRX cycle has been adjusted, and wherein DRX initialization or reconfiguration is performed based on that the accumulated number informed through the second information is different from an accumulated number of times, counted by the UE, the start of the on-duration of the subsequent DRX cycle has been adjusted.

* * * * *